July 8, 1952 E. D. ZORADI 2,602,782
METHOD AND APPARATUS FOR EXPANDING PERLITE
Filed Feb. 21, 1948 3 Sheets-Sheet 1

INVENTOR
ELKO D. ZORADI
BY
ATTORNEY

July 8, 1952 — E. D. ZORADI — 2,602,782
METHOD AND APPARATUS FOR EXPANDING PERLITE
Filed Feb. 21, 1948 — 3 Sheets-Sheet 3

INVENTOR
ELKO D. ZORADI
BY
ATTORNEY

Patented July 8, 1952

2,602,782

UNITED STATES PATENT OFFICE 2,602,782

METHOD AND APPARATUS FOR EXPANDING PERLITE

Elko D. Zoradi, Portland, Oreg., assignor to Dant & Russell, Inc., Portland, Oreg., a corporation of Delaware Application February 21, 1948, Serial No. 10,013

8 Claims. (Cl. 252—378)

My present invention relates to the art of forming a light weight material for use, by way of example, as a plaster or concrete aggregate, a filler for acoustical and insulating purposes, a soil lightener or conditioner, aggregate for acoustical tile and the like, and many other useful products, by expanding graded particles of a mineral known as perlite. This mineral is mined in several localities including the State of Oregon and has come into considerable usage in recent years in various fields of industry. The present invention is a continuation in part of the invention disclosed and claimed in my copending application, Serial No. 664,681, filed April 24, 1946, now abandoned.

The principal object of the present invention is to provide a method and apparatus whereby perlite particles are expanded from five to twelve, preferably about eight to ten, times their original volume in such manner that each particle is individually puffed to form a popcorn-like grain having numerous air cells defined by walls of siliceous material, the product being characterized by having considerable resistance to crushing in handling, shipping or mixing with other materials.

A further object of my invention is to provide apparatus in which my improved method may be employed and in which the expansion of perlite particles is uniformly accomplished without having the puffed particles thereafter fuse into solid spheres of material. A general object of the present invention is, therefore, to provide an effective and efficient process for expanding perlite.

A further object of my present invention is to provide a method for creation of expanded perlite whereby the formation of undesirable fines (non-cellular particles resembling dust or fine powder) is avoided, which method is economical not only in that the resulting product is uniform within permissible limits and does not require screening to remove fines, but in that waste effort and expense of crushing, transporting and further treatment of portions of a perlite ore mass, which by prior art methods formed fines, are avoided.

A further object of the present invention is to provide a method and means whereby continuous operation to produce expanded perlite of a plant once set in motion is brought about, thus permitting economical production.

A further object of the present invention is to provide a perlite expanding plant which is economical in operation and may be operated by a minimum number of workmen.

A further object of the present invention is to provide a plant for producing expanded perlite wherein all lightweight end products are captured for ultimate use in a number of fields of usage wherein fine powders of the character thus produced may be utilized.

The invention will be more readily understood by reference to the following specification taken in connection with the accompanying drawings wherein like numerals refer to like parts throughout, while the features of novelty will be more distinctly pointed out in the appended claims.

In the drawings—

Figure 1:
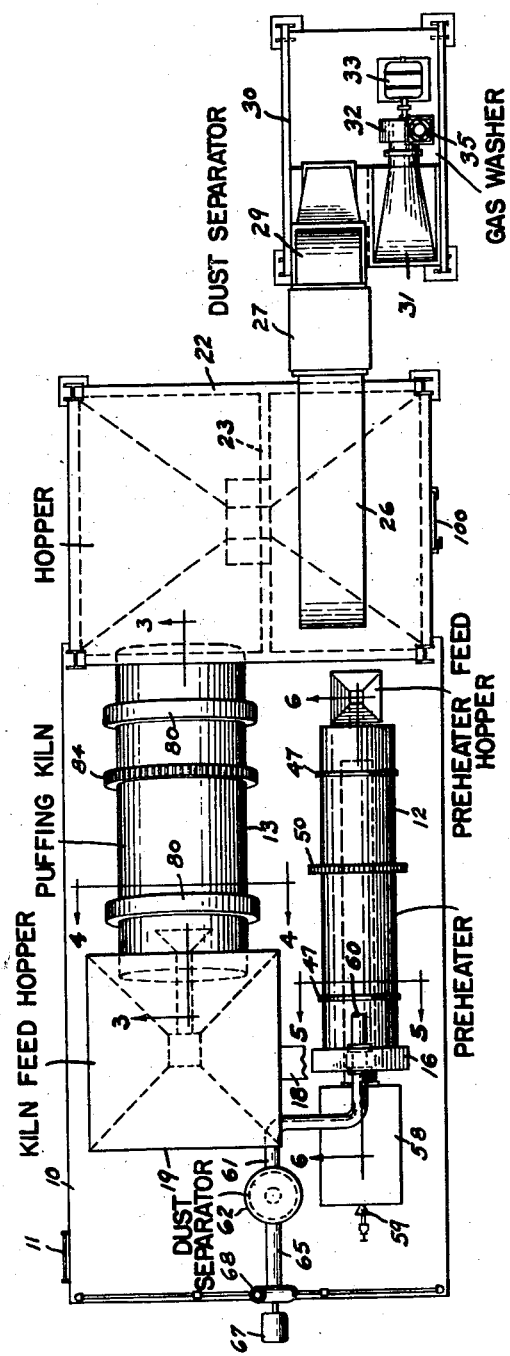
Fig. 1 is a plan view of a plant embodying my invention.
Figure 5:
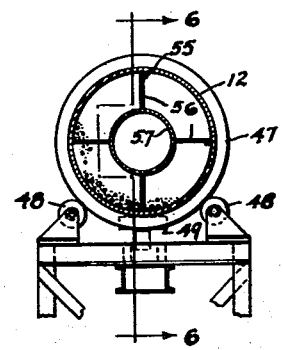
Figure 6:
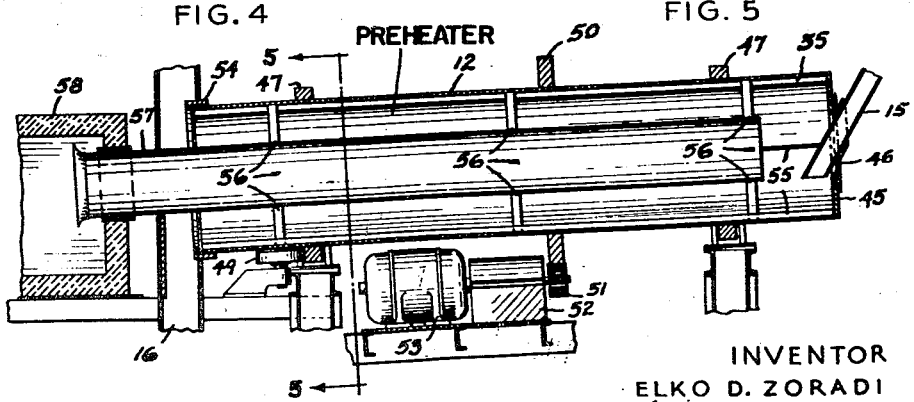

Fig. 5 is a vertical section taken substantially along line 5—5 of Figs. 1 and 6; and Fig. 6 is a vertical section taken substantially along line 6—6 of Figs. 1 and 5.

The present invention may best be understood by describing the process first, after which the particular equipment embodying my invention will be described.

Process

Perlite, which is a grey to greyish-black, volcanic, glassy, non-metallic rock, is essentially an impure silicon-aluminum oxide, the principal impurities usually being oxides of iron, sodium and potassium. In the raw or natural state rocks of the perlite type contain from about two to about seven, with true perlite containing from about three to about four, per cent by weight of combined water. Perlite is a rhyolitic glass as distinguished from obsidian which is a basaltic glass having less than about 0.5 per cent water of crystallization, usually none or almost none. The above percentages of water of crystallization are by weight. When perlite is ground or otherwise pulverized or comminuted and subjected to a temperature of from about 1200° F. to 2500° F., and higher temperatures, for a short period of time depending on the particle size, the particles are rapidly brought to the melting point and expansive gases generating internal pressures are created, causing the particles to expand to several times their original volume, the amount of expansion depending upon certain factors as will appear. The expansion or puffing of the particles is achieved when the particles are brought to their melting temperature rapidly and rendered plastic while steam from the water of crystallization is internally trapped. If the particles are heated slowly the water of crystallization is driven off through the pores of the particles and the particles become calcined. Calcined particles are porous particles of practically the same size and density as the original particles. Puffed particles are cellular, but not porous, inasmuch as the puffed particles are small masses of minute glass bubbles. In my process, I achieve substantially uniform expansion to about eight to ten times the original volume, the product weighing about eight to twelve pounds per cubic foot. I can control the process to achieve weights ranging from about six pounds per cubic foot to fifteen or twenty pounds per cubic foot; but in the first instance the degree of expansion is so great that the walls of the cellular bodies are too fragile and break down under plastering pressure or other handling, and in the last instance the amount of expansion is not sufficient to assure the highest value in thermal insulation, acoustical insulation, sound deadening, and other properties. When expanded to about eight to twelve pounds per cubic foot the resultant product is a white or light-colored material consisting substantially of a multitude of minute hollow cells of silica.

Perlite in commercial quantities appears in veins or buried masses with crystalline lavas and other impurities penetrating the outer layers. The percentage of water of crystallization in a single vein or mass may vary widely from place to place. In one large mass with which I am familiar, having a depth of about one hundred fifty feet, the upper layer of the perlite ore contains about five to seven per cent water of crystallization to a depth of several feet from the top surface, the main mass of the ore ranges from about three and one-quarter to four per cent water of crystallization, and the very bottom few feet contain about three per cent water of crystallization.

I have found that the degree of expansion of perlite particles depends to some extent upon the temperature at which expansion is effected, to some extent upon the amount of water of crystallization in the particles, to some extent upon the sizes of the particles, and to some extent upon other factors as will presently appear. It is an important step in my process to analyze the perlite ore for water of crystallization in order that all portions thereof having less than three per cent water of crystallization may be rejected, since such portions will not react to the heat treatment in a satisfactory manner.

In order to determine the percentage of water of crystallization a sample of the perlite is crushed to the desired size, placed in a drier at 240° F. for one hour, until thoroughly dried of all surface or capillary moisture, and a ten-gram sample is segregated therefrom. This sample is weighed, then brought to 1200° F. in a muffle for one hour. The difference in weight before and after subjecting to this high temperature is the weight of the water of crystallization.

I have also determined that if more than about four and one-half per cent by weight of water of crystallization is present the perlite is more siliceous and has a lower melting point so that it requires less heat to melt particles of a given size, and also the resulting product is shattered or exploded to such an extent as to be too fragile or too fine for most purposes; for example, a certain size particle of perlite will be properly melted to a plastic state at 2500° F. if it contains three and one-half per cent water of crystallization, but if the sample contains four and one-half per cent water of crystallization a temperature of 1800° F. is all that is necessary properly to melt the particles. Similarly, I have found that variations in amount of certain impurities cause variations in the melting temperature, but to a lesser extent than variations in the amount of water of crystallization. One of the impurities which may be removed is clay which is formed in the cracks between the small, solid masses of the ore. This clay is visible to the naked eye as fine lines or jagged streaks. An important part of my process is to crush the ore and, while grading it to maintain a certain maximum and minimum size limit, to wash the clay dust out of the perlite ore. If the clay is permitted to remain with the perlite ore it will to a certain extent cause fusing together of expanded particles, rendering the end product unfit for use. This result is due to the relatively low melting point of clay.

Accordingly, important steps which should be followed in producing expanded perlite are to analyze the ore for water of crystallization and retain only those portions having between three and four per cent by weight water of crystallization, to comminute the retained ore and grade it as to size, and to wash the comminuted ore to remove dust which is principally clay from the cracks occurring in the veins of the ore.

The next step in my process is to dry the washed particles so that uniform conditions may be maintained in the puffing apparatus. The particles are dried before being subjected to puffing temperatures in such manner as to remove free water therefrom. Drying is accomplished by subjecting the particles to heat while shielding them from direct flame or high temperatures.

The degree of expansion of the particles depends somewhat upon the temperature at which expansion is effected. For medium size particles a certain temperature is satisfactory, for larger particles a higher temperature, and for smaller particles a lower temperature. The temperature, however, cannot be too easily controlled; hence I fit the particle size to the temperature of the flame produced by standard fuels. Preferably, I expand perlite in a propane-air mixture having a flame temperature of about 2500° F., and I have determined that particles graded to limits of minus twenty screen mesh to plus one hundred fifty screen mesh uniformly pop to about eight times their volume in this temperature when other conditions are controlled in accordance with my disclosure. If a higher percentage of fines is desired the limits may be altered to minus thirty mesh to plus one hundred fifty mesh. Various other fuels may be employed, such as oil-air mixtures and various mixtures of gases and air such as manufacturer's gas, producer's gas, or the like. All such flames will produce a flame temperature of about 2500° F. or higher, and the particle size and the number of particles per unit of time injected into the flame may be varied so as to maintain uniformity of the puffed product. When I speak of a flame temperature of 2500° F. or higher, it should be realized that the term is necessarily indefinite because of the variability of the calorific value of the fuel and the problems inherent in maintaining an even fuel-air mixture. Observations taken over several years prove that the best results are obtained with a fuel mixture having a theoretical flame temperature of 3200° F. The area of flame contact with the perlite particles when using such a fuel is consistently measured with an optical pyrometer as having a temperature of 2500° F., with occasional fringe spots and variations up to 2800° F. The lowering of the mean temperature from the theoretical temperature is undoubtedly due to the cooling effect of the introduced perlite, and local variations or variations from time to time are due to variations in the fuel, the fuel-air ratio, variations in the composition of the perlite and its free water, and irregularities in feeding the perlite into the flame.

It is an important step in my process that the flame zone into which the particles are projected be maintained at 2500° F., or approximately the same, for ore of three to four per cent water of crystallization, and lower for higher percentages of water, which requires balancing of the quantity or mixture of the fuel, the quantity of secondary air admitted, and the quantity of particles admitted. The maintained temperature could vary, but a considerably higher temperature would fuse puffed particles together, all other conditions being equal, and a lower temperature would calcine or desiccate some particles. I have determined that dehydration accompanied by a minimum degree of expansion takes place when particles of about one hundred fifty mesh are subjected to temperatures below 1200° F.; when quickly heated to 1500° F. they are expanded to about five times their original volume; while at 2100° F. they expand to between nine and ten times their original volume. If, however, these fine particles are included among larger particles up to twenty mesh the same amount of expansion takes place at higher temperatures so that 2500° F. flame temperature or heating zone temperature appears to be essential. If the larger particles alone are subjected to temperatures of about 1200° F. hardly any expansion takes place but the particles will desiccate or calcine; when quickly heated to around 2000° F. they expand five or six times their original volume; and when quickly heated to 2500° F. they puff to the desired eight to ten times their original volume. Thus when particles graded between the desired limits are subjected to temperatures of 2500° F. they produce an end product having eight to ten times the original volume and a weight of about eight to twelve pounds per cubic foot.

Gradual dehydration of the particles must be avoided, since such dehydration results in the water of crystallization escaping slowly without forming expanded cells in the particles. On the other hand, it would do no good to rapidly form gases including steam from the water of crystallization if the perlite particles were not brought to the melting temperature. I have determined that a temperature of about 1200° F. is the low limit of melting of fine particles of perlite ore such as one hundred fifty mesh, and 2500° F. may be necessary to melt larger particles such as twenty mesh. A graded mixture as above melts uniformly when air-borne at temperatures of 2500° F. The two acts of forming gases and fusing the silicate must take place simultaneously so that the internal pressure of the gases can create spherical cells of melted silicate. However, if the particles are allowed to remain in a melted state longer than an instantaneous interval of time and come in contact with each other in a melted state the particles will fuse together into solid masses of glassy material. Therefore, an important step in the process is to remove the puffed particles from the melting temperature zone immediately upon formation of the puffed particles. Various means may be employed for creating a melting zone of limited extent, and various means may be employed quickly to remove the expanded particles from the melting zone; for example, air, nitrogen or other gas inert to melted perlite may be heated and projected as a blast of hot gas to which the perlite is subjected, the hot gas being drawn off under forced draft of sufficient velocity to float the puffed particles at high speed away from the hottest portion of the zone to cooler regions before being allowed to reduce its velocity to such an extent that the puffed particles may drop from the escaping gas while cooling below 1200° F., the temperature at which fine particles would fuse together. Preferably, however, the action is accomplished in a forced-draft flame, the hottest portion of the flame being at 2500° F. or higher, and the flame being under forced draft so that the products of combustion are drawn from the hottest zone at such high velocity as to float the puffed particles and convey them to cooler regions. At a region where the temperature is at or below 1800° F. the velocity of the products of combustion is reduced and preferably the direction thereof changed so that puffed particles drop from the conveying blast. At this point the particles are below the fusing temperature thereof and will not stick to each other or to the walls of the furnace or the like, or be reduced to solid spheres by surface tension.

A further point which I have discovered is that the direction and manner of injection of perlite particles into the flame or hot blast is important. I prefer to inject a thin sheet of the particles at relatively high velocity, such as by propelling them dispersed in a blast of compressed air, directly into the hottest portion of the flame, at right angles to the direction of the flame. If the particles are propelled into the flame in the direction of the blast most of the lighter particles will be shot from the hot expanding zone before sufficient expansion can occur and the steam will escape harmlessly, leaving a calcined or desiccated product which will either remain as a hard grit or will break into a fine powder. If the direction of propulsion is substantially coincident with the direction of the flame very little puffing will be accomplished. The higher the angle of incidence the greater the efficiency becomes until the maximum percentage of expansion of particles takes place when the angle of incidence is ninety degrees or greater. No advantage is achieved by having an angle of incidence greater than ninety degrees, since although more expansion might take place finer particles might not be propelled directly through the flame in the event they are not puffed immediately and would be turbulently carried around in the flame zone until fused solidly together. Therefore, I prefer to have the injection take place at an angle of ninety degrees and preferably directed downward through a horizontally directed flame so that all particles which do not puff immediately upon contact with the flame are shot to the bottom of the flame chamber below the point of contact which may be maintained at a temperature below 1200° F., the point at which the finer unpuffed particles fuse together.

I have determined that the major proportion of the particles are puffed on the first passage through the flame, but a considerable percentage, particularly of larger particles, will shoot through the flame without being puffed. I collect these particles and elevate them through a zone having a temperature of less than 1200° F. to a point above the flame from which they are dropped through the flame. Most of such particles are puffed on the second contact with the flame.

A specific apparatus for carrying out the process of the present invention will now be described, the preferred embodiment thereof being illustrated in the accompanying drawings.

I prefer to use a horizontal, rotating drum kiln, the interior of which is substantially three feet in diameter by ten feet long with the actual flame confined to the axial portion of the drum and to a length of about six feet or less from one end. The burning fuel is injected at one end and the ore particles are blown into the hottest portion of the flame zone in a thin sheet at a rate such that the desired temperature conditions are maintained. Air to support combustion is admitted as primary air mixed with the fuel, and as secondary air flowing through small openings adjacent to the burners which extend into one end of the drum, the end of the drum being substantially sealed by a shield so that control of the draft may be achieved. Some secondary air is also admitted through the particle injector. Forced draft is induced by a mechanical blower at the far end of the apparatus at a rate such that a negative pressure of one and three-tenths to one and six-tenths inches of water is maintained in the kiln, sufficient to cause movement of the expanded particles from the kiln to a separator at the end of the kiln in about five seconds or less. However, the horizontally directed flame blast is such as to propel the light, puffed particles from the flame itself substantially instantaneously. When pure butane or propane is used as a fuel the theoretical flame temperature is about 3850° F., but the preferred fuel is either of the above gases mixed in certain proportions with air to create a mixture having a theoretical flame temperature of 3200° F. and an actual flame temperature of about 2500° F., due to the cooling effect of the injected perlite. I find that controlling the rate of fuel feed, or the rate of secondary air admission, or the speed of an exhaust fan, or the rate of introduction of the perlite particles into the flame, or any combination thereof so as to maintain a temperature of about 1800° F. at the outlet end of the rotating drum, achieves the best results. Under the conditions stated the expanded particles are air-borne and reach a cooler region of the drum before they can be fused together or formed into solid glassy particles by surface tension. This is not only important in order that the particles may be uniform but is extremely important to successful plant operation. If for any reason fusing together occurs while the particles are air-borne, deposits of glassy material soon build up in the kiln or separator and the plant must be shut down while linings are replaced or deposits chipped off. Since from one to three days are required to permit sufficient cooling to occur, it is readily understandable that fusing is costly. In accordance with my process and when it is carried out in my apparatus as described such fusing is substantially eliminated.

As a further step, the kiln discharges into air separators where the fines are separated from the heavier puffed particles and each is separately bagged for use in its own field, or the two may be mixed in various proportions for some purposes.

My process results in a kiln end product having five per cent or less fines of minus 100 mesh, whereas others report, and I have observed plants producing, end products having fines of minus 100 mesh as high as seventy-two per cent. Since the fines are not very commercially accepted at the present time, my process is highly desirable and renders the operation profitable.

Expanded perlite made in accordance with the foregoing process conforms with the standard specifications of the American Society for Testing Materials for sand screen analysis of plaster sand, which are as follows:

| Retained on Sieve | Percentage Retained | |
|---|---|---|
| | Maximum | Minimum |
| No. 4 (4760-micron) | 0 | |
| No. 8 (2380-micron) | 10 | 0 |
| No. 30 (590-micron) | 80 | 15 |
| No. 50 (297-micron) | 95 | 70 |
| No. 100 (149-micron) | | 95 |

The amount of material finer than a No. 200 (74-micron) sieve, shall not exceed five per cent.

The sieves shall conform to the requirements of the Standard Specifications for Sieves for Testing Purposes (A. S. T. M. Designation E11) of the American Society for Testing Materials.

Apparatus

Figure 2:
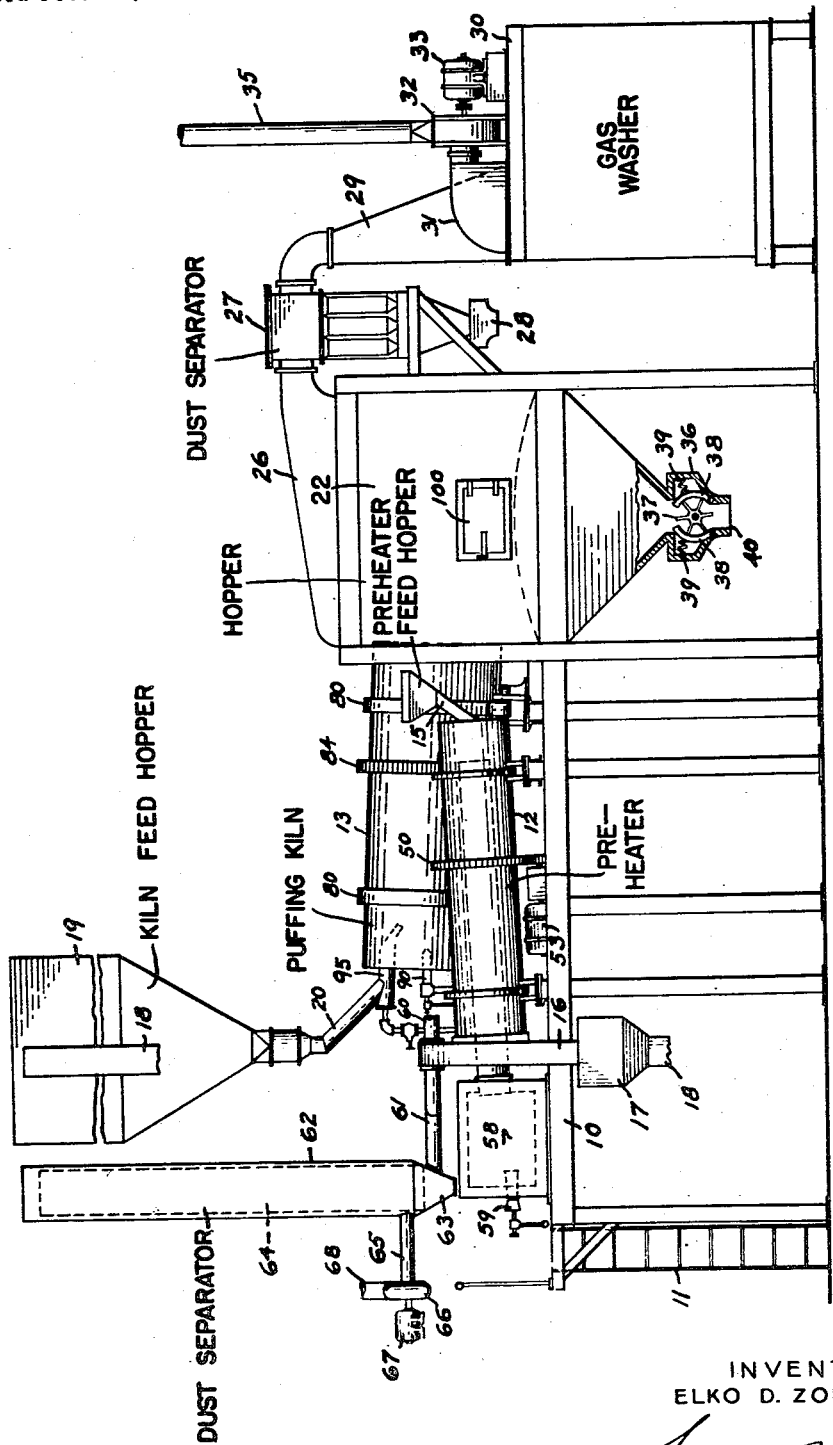
Fig. 2 is a side elevation of the plant disclosed in Fig. 1, with some portions broken away.
Figure 3:
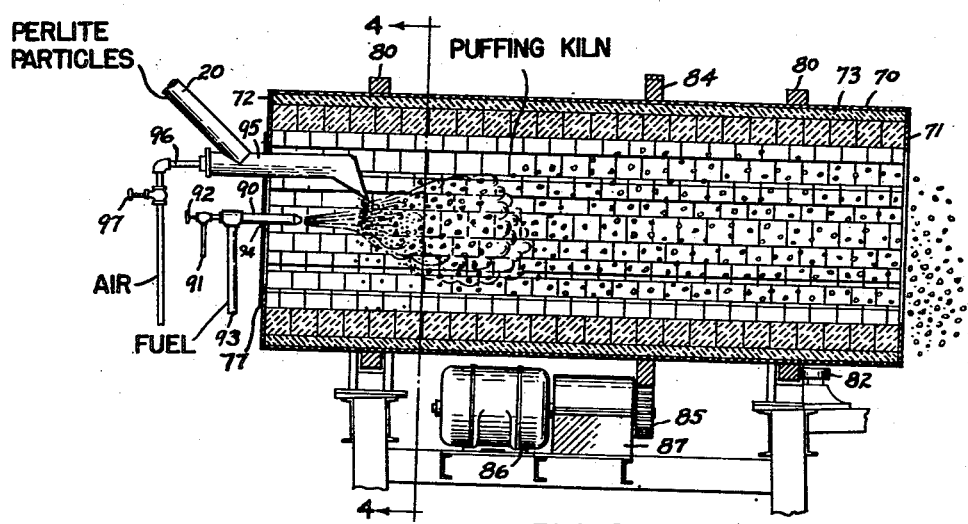
Fig. 3 is a vertical section taken substantially along line 3—3 of Figs. 1 and 4.
Figure 4:
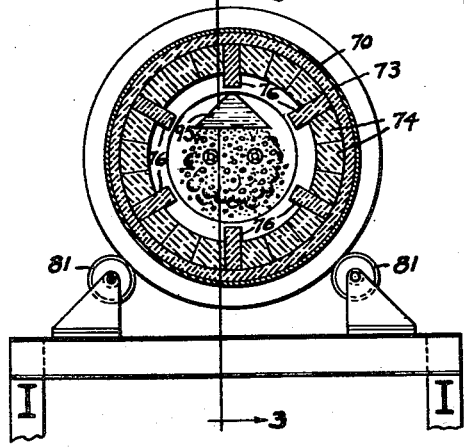
Fig. 4 is a vertical section taken substantially along line 4—4 of Figs. 1 and 3.

The preferred apparatus for carrying out the method of the invention comprises an elevated platform 10 which may be reached by a ladder 11. Mounted upon the platform 10 are a preheating kiln 12 and an expanding or puffing kiln 13, details of which will be described below. The crushed or otherwise comminuted perlite, graded and washed as previously described, is fed into an inclined preheating kiln through a chute indicated by the numeral 15. The preheated particles drop from the lower end of the kiln 12 into an end bell 16 which feeds into a hopper 17 having a passage 18 extending therefrom. Any suitable type of elevating mechanism (not shown) may be provided to take the material from the lower portion of chute 18 to its upper end at a considerable height above the puffing kiln 13 where the material is deposited in a large hopper 19. The material travels through a chute 20 from the bottom of hopper 19 into an injector which extends into the puffing kiln 13 where the particles are subjected to heat under controlled conditions. The puffed particles are ejected from the kiln 13 into the upper left half of a large, covered hopper 22 which has a heat reflecting wall opposite the mouth of the kiln and which is provided with an intermediate baffle 23 extending downward from the top wall to a point below the lower edge of the kiln 13, the baffle preferably having an arched lower edge as shown by dash lines in Fig. 2. The large size of the hopper permits the gases to reduce their velocity and cool by expansion sufficiently to drop the floating particles, this action being aided by the changes in direction of flow. A duct 26 communicates with the top of the hopper 22 at the right side of the baffle 23 and opens in to a suitable dust separator 27 having an airtight dust ejecting valve 28 at the lower end thereof. The outlet of the separator 27 comprises a duct 29 which extends downwardly into a washing chamber 30 having suitable spray means (not herein disclosed) for washing any remaining fine dust from the gases passing therethrough and to cool the gases before they contact the blower.

The outlet of washer 30 comprises a duct 31 extending to the inlet of a mechanical blower 32 driven by a motor 33, which exhausts the cool, washed gases to the atmosphere thorugh a flue 35.

Puffed particles which flow from the puffing kiln 13 drop into the bottom of hopper 22 and may be removed therefrom through an airtight valve 36. The valve 36 preferably comprises a housing enclosing a revolvable paddle wheel 37 having its projecting vanes adapted to bear against a pair of curved plates 38 which are pressed against the ends of the vanes by springs 39. Material which is caught in the pockets between vanes will be carried past the plates 38 and dumped through an outlet 40 shaped to enter the mouth of a sack or the like. The wheel 37 may be rotated by any suitable means, and sacks or other containers may be associated with the outlet in any suitable manner. It is only important that the valve 36 be capable of ejecting the material without permitting ingress of any air. The valve 28 is preferably of similar character and is adapted to eject fine material into containers without permitting ingress of any air. Thus the draft which is created by the blower 32 extends through the washer 30, fines separator 27, solids separator 22 and kiln 13 to the burners.

In order that the finely crushed material may be thoroughly dried without subjecting the material to flame, and in order to increase efficiency and cause uniform feeding and temperature control to result, the preheating kiln 12 preferably comprises a large cylindrical drum set on an incline from right to left. The upper end of the kiln is provided with an end wall 45 having a central opening therethrough into which the chute 15 extends, there preferably being provided a stationary sealing member 46 having a flange overlying the flange provided by the end wall 45. The drum is provided with a pair of bearing rings 47 rolling on pairs of spaced rollers 48 mounted upon suitable journals extending upward from the platform 10. A thrust bearing may be provided by means of a substantially horizontal wheel 49 bearing against the lower side of one of the bearing rings 47. The drum is surrounded by a large gear 50 meshing with a pinion 51 driven through reduction gear means 52 by a motor 53. The lower end of the drum 12 extends into a stationary sealing ring 54 provided at the side of the end bell 16. The drum is provided with a plurality of longitudinally extending interior ribs 55 upon which are mounted a plurality of struts 56 extending inwardly to support a central, coaxial flame tube 57. The flame tube is open at both ends, the upper end terminating short of and above the outlet of chute 15 and the lower end extending through the end bell 16 into a firebox 58. The firebox is filled with the burning products of combustion ejected thereinto from suitable means such as the gas burner 59 herein indicated. The products of combustion emerging from the upper end of the tube 57 reverse direction and flow back between the tube 57 and the outer shell and pass into the end bell 16.

The upper end of end bell 16 communicates at one side with a duct 60 which is open to the atmosphere and may lead from a point outside of the plant so as to permit the introduction of cool fresh air. At the opposite side of the upper end of end bell 16 a duct 61 communicates with the lower end of a dust separator 62. The dust separator preferably comprises a conical lower extremity 63 having a suitable clean-out valve therein (not herein detailed) into which the duct 61 extends. Gases passing thereinto pass upward through a central cylinder 64 rising almost to the imperforate top of the outer cylinder forming the shell of the collector 62 and then pass downwardly between the inner and outer cylinders. A duct 65 communicates with the bottom of this space and extends into the inlet of a blower 66, driven by a motor 67, which forces the gases outwardly through an exhaust duct 68.

By the use of such a preheating kiln the ore particles may be preheated to the desired temperature without coming into contact with flame or burning material since combustion is entirely completed in the firebox 58 and the long tube 57. The particles may thus be thoroughly dried but at the same time are not subjected to heat in such a manner as to cause calcination thereof. The consumed hot gases pass through the space between the inner and outer tubes in contact with the particles of material which are being sifted through the gases by the longitudinal ribs 55. The hot gases, bearing some dust particles, will be cooled by the air entering through duct 60 and the dust will be separated in the separator 62. The dust collected in the conical tip 63 may be kept for some purposes or removed to a waste heap. The hot particles are elevated into the hopper 19 and are then subjected to direct flame in the puffing kiln.

The purpose of preheating the particles is to increase the over-all efficiency of the plant and to dry the particles so that they will flow evenly and smoothly through the injector into a uniform heating zone. If for any reason the free moisture content of the particles varies irregularly the corresponding end product will vary irregularly in density, also deposits of fused glass may be created in the interior if free water is present. Likewise, if the moisture content varies, the feeding of the particles will be irregular, hence the temperature of the flame zone will be irregular and many particles will calcine or fail to puff.

The puffing kiln preferably comprises a large, inclined drum 70 having a narrow annular flange 71 at its outlet end and a wide annular flange 72 at its inlet end. The inner surface of the drum 70 may be lined with a suitable ceramic lining 73 or other insulating material upon which are laid a plurality of fire bricks 74, certain courses of which project inwardly to form longitudinal ribs 76. The flanges 71 and 72 provide means to retain the lining and bricks in position while flange 72 serves further to provide a sealing ring to ride against a baffle plate 77 surrounding the burners 90 and through which the injector 95 projects. The shell 70 is provided with a pair of bearing rings 80 each adapted to rest upon a pair of supporting wheels 81 mounted on a frame supported by the platform 10. The lower ring 80 bears against a horizontally disposed wheel 82. A centrally disposed gear 84 meshes with a pinion 85 driven by a motor 86 through a reduction gear box 87. The kiln thus continuously rotates to permit the ribs 76 to pick up any particles which may not have been puffed while passing through the flame zone and cause them to drop through the heated gases. The distance of the walls of the puffing kiln from the flame zone is such that the temperature thereof surrounding the point of contact of the particles with the flame is maintained preferably below 1200° F. and the speed of rotation of the kiln and the number of ribs is such that the particles capable of puffing on second or third passage through the flame are not fused while being elevated, or desiccated without having a chance to become puffed. The incline of the kiln and the force of the flame helps in distributing the elevated particles evenly along the line of the flame so as to avoid concentrations of elevated particles in the region of injection of the fresh particles.

A plurality of burner nozzles 90 project into the inlet end of the kiln, the number of nozzles and the location thereof being selected so as to create a centrally disposed, longitudinally directed flame zone in the first third of the kiln. The nozzles are preferably such as to create a combustible mixture of a fuel such as producer gas, butane, propane or the like admitted thereinto through a supply tube 91 controlled by valve 92, and air admitted through a supply tube 93. The details of such valves and nozzles are not herein disclosed, as many such valves and nozzles are available. The baffle plate 77 is provided with openings 94 adjacent the nozzles 90 for the admission of secondary air.

The preheated particles of perlite are admitted to the flame zone through a spreader 95, into the top outer end of which the particles are admitted from the chute 20. The particles are projected or forcibly sprayed from the spreader by a blast of compressed air admitted through a supply tube 96 having a regulating valve 97 therein. The inner end of the spreader 95 is flared laterally and directed downwardly into the hottest portion of the flame issuing from the nozzles 90, the construction being such that a fan-shaped thin sheet of fine particles is propelled vertically into the burning fuel. The creation of a thin sheet of particles assures the subjection of all particles to the same treatment since flame of uniform temperature simultaneously impinges upon all particles. The spreader 95 preferably comprises a turned-down lip at such an angle as to cause the particles of air-borne perlite impinging thereagainst to project downwardly through the hottest part of the flame zone at about ninety degrees to the axis of the flame blast. The valve 97 provides means whereby the amount of perlite fed through the flame may be varied. Automatic means may be installed responsive to the temperature at the outlet end of the kiln for controlling the draft or the amount of feed or the like, but normally it is sufficient to establish control manually.

Because of the human element involved some fused particles may be formed and collect upon the kiln or the interior of the hopper 22, principally because of injection of perlite particles before the ideal operating temperatures have been achieved, and secondly because the operator has no way of knowing whether the draft is sufficient until he has observed the resulting actions of the puffed particles. Various conditions of atmospheric pressure, wind velocity or other factors may affect the draft so that some particles may be fused from time to time. In order to replace lining materials or to permit chipping out deposits of fused particles I preferably provide the hopper 22 with an entrance door 100.

It is to be appreciated that various other forms of apparatus may be substituted for those herein disclosed, and various modifications in arrangement and detail will be readily apparent to those skilled in the art. I claim all such modifications as come within the true spirit and scope of the appended claims as a part of my invention.

I claim:

1. The process of expanding finely divided perlite particles which comprises the steps of forcibly propelling dispersed particles of perlite in a thin flat, fan-shaped compressed air stream directed downwardly into a horizontally directed flame having a temperature above 2500° F. at the point of contact of the perlite particles with the flame at which point most of said particles are rapidly expanded, the plane of said compressed air stream being transverse to the axis of the flame, providing a forced draft for said flame whereby all of said expanded particles are carried with the products of combustion longitudinally of said flame to a relatively cool region remote therefrom, collecting beneath said flame the remaining unexpanded particles which pass therethrough, and mechanically elevating said unexpanded particles around said flame through a zone having a temperature less than 1200° F. to a point above said flame, and dropping said unexpanded particles into said flame.

2. The process of expanding perlite which comprises the steps of forming a flame about a substantially horizontal axis, said flame being produced by a mixture of a gaseous fuel and air having a flame temperature above 2500° F., creating a forced draft for said flame to maintain rapid travel of the products of combustion thereof horizontally to a point remote from said flame where the temperature thereof drops below the fusion temperature of expanded perlite particles, and forcibly projecting a thin sheet of finely divided perlite particles into said flame in a compressed air stream coming from above and substantially at right angles to the horizontal axis of the flame, the plane of said thin sheet extending substantially normal to the direction of the flame axis, said perlite particles being introduced into said flame at a point having a temperature above 2500° F. at which point most of said particles are rapidly expanded, said forced draft being of sufficient strength rapidly to carry expanded particles in free space from said flame to said remote point.

3. A puffing kiln for expanding perlite particles comprising a substantially horizontal kiln, burner means to project a flame of relatively high temperature into one end of the kiln, and means to inject a thin, relatively wide sheet of perlite particles across the flame, said means comprising a nozzle unit extending into one end of said kiln and having a relatively narrow, elongated discharge opening, said opening extending longitudinally in the direction transversely of the axis of said flame and directed in a direction substantially perpendicular to the longitudinal axis of said flame whereby the plane of said sheet of perlite particles projected through said nozzle opening extends substantially at right angles with respect to the longitudinal axis of said flame.

4. A puffing kiln for expanding perlite particles comprising a substantially horizontal kiln, burner means to create a flame zone of relatively high temperature at one end of the kiln and directed longitudinally thereof, nozzle means to forcibly inject a relatively wide, thin sheet of perlite particles transversely of the flame zone, said nozzle means having a relatively narrow, elongated discharge opening extending transversely of said kiln and directed downwardly toward said flame zone whereby the plane of said sheet of particles projected from said nozzle extends substantially at right angles with respect to the longitudinal axis of said flame, and means to control the draft through the kiln whereby puffed particles may be withdrawn in air-borne fashion from the flame zone at a speed such that fusing of the puffed particles is prevented.

5. Apparatus for expanding perlite comprising a cylindrical kiln having a refractory lining, means for rotating said kiln in an inclined position about its longitudinal axis, means comprising a pressure burner for directing a flame into one end of said kiln along the longitudinal axis thereof, blower means for introducing finely divided perlite into and across said flame, suction means operatively connected to the other end of said kiln for withdrawing expanded perlite from said kiln, and longitudinal ribs on the inner wall of said kiln adapted on rotation of said kiln to convey the unexpanded perlite falling to the bottom of said kiln to a point above the flame.

6. Apparatus for expanding perlite into and comprising an inclined cylindrical kiln, means for rotating said kiln about its longitudinal axis, a burner having a nozzle extending into the upper end of said kiln and adapted to direct a flame along the longitudinal axis of said kiln, conduit means for directing an air stream carrying finely divided perlite into and across said flame, said conduit means having a transversely flaring outlet terminating above and in front of said burner nozzle, a settling chamber at the lower end of said kiln of relatively large volume to permit expansion and cooling of the products of combustion, and suction means operatively connected with said chamber for withdrawing expanded perlite from said kiln.

7. Apparatus for expanding perlite comprising a substantially horizontal, slightly inclined, cylindrical kiln having a refractory lining, means for rotating said kiln about its longitudinal axis, a burner having a nozzle extending into the upper end of said kiln and adapted to direct a flame along the longitudinal axis of said kiln, means for injecting a thin, fan-shaped sheet of finely divided perlite into said kiln from above and into said flame with the plane of the sheet being at right angles to the axis of the flame, a settling chamber at the lower end of said kiln and having a substantially vertical wall opposite and in heat reflecting relation to the lower end of said kiln, and suction means connected with said chamber for withdrawing expanded perlite from said kiln into said chamber and the products of combustion from said chamber.

8. Apparatus for expanding perlite comprising an inclined, cylindrical kiln having a refractory lining, means for rotating said kiln about its longitudinal axis, a burner having a nozzle extending into the upper end of said kiln and adapted to direct a flame along the longitudinal axis of said kiln, means for injecting a thin sheet of finely divided perlite into said kiln downwardly acros said flame, a settling chamber at the lower end of said kiln and having a hanging baffle at one side of and parallel to said kiln and extending below the level of said kiln, and suction means connected with said chamber beyond said baffle for withdrawing expanded perlite from said kiln.

ELKO D. ZORADI.

REFERENCES CITED

The following references are of record in the file of this patent:

UNITED STATES PATENTS

| Number | Name | Date |
|---|---|---|
| 371,715 | Sonnet | Oct. 18, 1887 |
| 423,598 | Duncan | Mar. 18, 1890 |
| 920,333 | Hughes | May 4, 1909 |
| 1,456,392 | Marshall | May 22, 1923 |
| 1,488,055 | Newberry | Mar. 25, 1924 |
| 1,628,197 | Ryder | May 10, 1927 |
| 1,779,626 | Horn et al. | Oct. 28, 1930 |
| 1,909,820 | Falla | May 16, 1933 |
| 1,963,276 | Miner et al. | June 19, 1934 |
| 2,021,956 | Gladney | Nov. 26, 1935 |
| 2,026,441 | Shafter et al. | Dec. 31, 1935 |
| 2,160,956 | Cheesman | June 6, 1939 |
| 2,265,358 | Denning | Dec. 9, 1941 |
| 2,300,042 | Caldwell | Oct. 27, 1942 |
| 2,306,462 | Moorman | Dec. 29, 1942 |
| 2,388,060 | Hicks | Oct. 30, 1945 |
| 2,421,902 | Neuschotz | June 10, 1947 |
| 2,431,884 | Neuschotz | Dec. 2, 1947 |
| 2,455,666 | Fournier | Dec. 7, 1948 |
| 2,501,962 | Pierce | Mar. 28, 1950 |
| 2,505,249 | Johnson et al. | Apr. 25, 1950 |

FOREIGN PATENTS

| Number | Country | Date |
|---|---|---|
| 420,041 | Germany | Oct. 14, 1925 |

OTHER REFERENCES

Perlite, Source of Synthetic Pumice, Bur. of Mines, pub. IC 7364, Aug. 1946, pgs. 2 and 3.

State of Oregon, Dept. of Geology and Mineral Resources, GMI, Short Paper No. 16, Dec. 1946, pgs. 10 and 12.

Univ. of Ariz., Bulletin, vol. 15, No. 4, p. 34 (Oct. 1944).